United States Patent
Savalle et al.

(10) Patent No.: US 10,924,353 B2
(45) Date of Patent: Feb. 16, 2021

(54) PROGRESSIVE REFINEMENT OF DEVICE CLASSIFICATIONS USING COLORED DEVICE AND POLICY TREES

(71) Applicant: Cisco Technology, Inc., San Jose, CA (US)

(72) Inventors: Pierre-Andre Savalle, Rueil-Malmaison (FR); Jean-Philippe Vasseur, Saint Martin d'uriage (FR); Grégory Mermoud, Veyras VS (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/424,574

(22) Filed: May 29, 2019

(65) Prior Publication Data
US 2020/0382376 A1    Dec. 3, 2020

(51) Int. Cl.
*G06F 15/173*    (2006.01)
*H04L 12/24*    (2006.01)
*H04L 12/26*    (2006.01)
*G06N 20/00*    (2019.01)

(52) U.S. Cl.
CPC ............. *H04L 41/12* (2013.01); *G06N 20/00* (2019.01); *H04L 41/16* (2013.01); *H04L 43/04* (2013.01)

(58) Field of Classification Search
CPC .. G06F 11/1464; G06F 11/1451; G06F 3/067; G06F 11/1453; G06F 2201/84; G06F 11/1469; G06F 11/2094; G06F 16/27; G06F 3/065; H04L 67/1097; H04L 41/0893
See application file for complete search history.

(56) References Cited

U.S. PATENT DOCUMENTS

| | | | |
|---|---|---|---|
| 6,484,261 B1 | 11/2002 | Wiegel | |
| 8,270,310 B2 | 9/2012 | Raleigh | |
| 8,316,128 B2 | 11/2012 | Beck et al. | |
| 8,341,717 B1 * | 12/2012 | Delker | H04L 63/20 705/56 |
| 9,055,111 B1 * | 6/2015 | Martini | H04L 63/20 |
| 9,215,613 B2 | 12/2015 | Raleigh et al. | |
| 10,075,429 B2 | 9/2018 | Jayanti Venkata et al. | |

(Continued)

OTHER PUBLICATIONS

European Patent Office Search Report Communication for Application No. 20176424.8-1218, dated Oct. 14, 2020.

(Continued)

*Primary Examiner* — Michael A Keller
*Assistant Examiner* — Thao D Duong
(74) *Attorney, Agent, or Firm* — Behmke Innovation Group LLC; Kenneth J. Heywood; Jonathon P. Western

(57) ABSTRACT

In one embodiment, a device classification service classifies a device in a network as being of a first device type. The service applies a first network policy that has an associated expiration timer to the device, based on its classification as being of the first device type. The service determines whether the device was reclassified as being of a different device type than that of the first device type before expiration of the expiration timer associated with the first network policy. The service applies a second network policy to the device, when the service determines that the device has not been reclassified as being of a different device type before expiration of the expiration timer associated with the first network policy.

20 Claims, 9 Drawing Sheets

(56) References Cited

U.S. PATENT DOCUMENTS

| | | | |
|---|---|---|---|
| 2004/0215649 A1* | 10/2004 | Whalen | H04L 41/0893 |
| 2012/0011561 A1* | 1/2012 | Courtney | G06F 21/604 |
| | | | 726/1 |
| 2014/0129557 A1 | 5/2014 | Rahnama | |
| 2015/0049604 A1 | 2/2015 | Keith et al. | |
| 2018/0159751 A1 | 6/2018 | Zhang et al. | |
| 2020/0162516 A1* | 5/2020 | Israel | H04L 63/1416 |

OTHER PUBLICATIONS

European Patent Office Search Report for Application No. 20176424.8-1218, 3 pages.
Cf Form 1507 for Application No. 20176424.8.

* cited by examiner

PROGRESSIVE REFINEMENT OF DEVICE CLASSIFICATIONS USING COLORED DEVICE AND POLICY TREES

TECHNICAL FIELD

The present disclosure relates generally to computer networks, and, more particularly, to the progressive refinement of device classifications using colored device and policy trees.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular device is known to the network. For example, the network may limit a particular type of sensor to only communicating with its supervisory device. Typically, this classification is made by observing the behavior of the device during a short period of time after joining the network (e.g., the first minute). However, this approach is also prone to misclassifications, as some devices of different types exhibit very subtle behavioral differences from one another. While long-term observation of the behavior of a device can yield better classification results, there is also the competing need to ensure that an appropriate policy is applied to the device at all points in the process.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
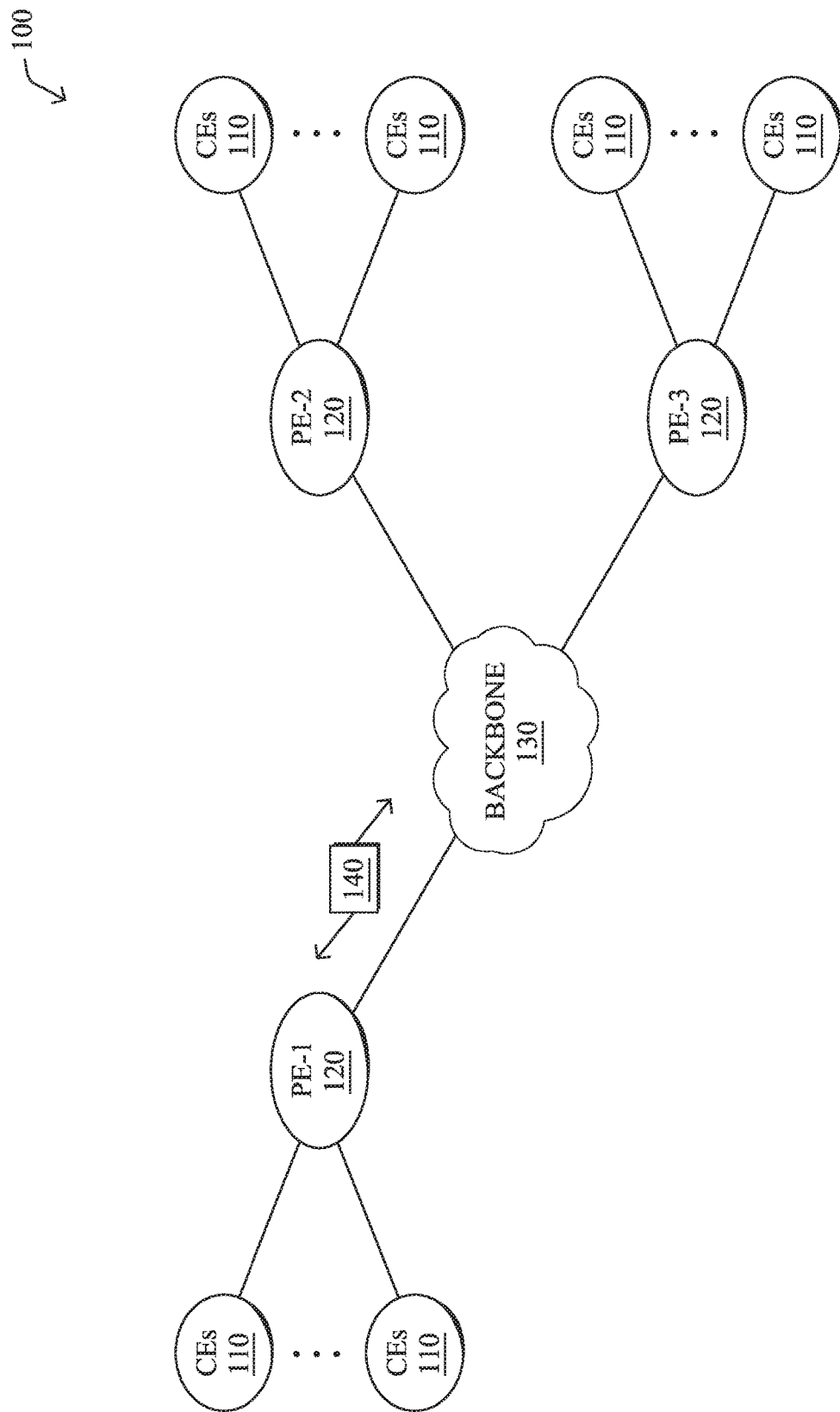
FIGS. 1A-1B illustrate an example communication network.

According to one or more embodiments of the disclosure, a device classification service classifies a device in a network as being of a first device type. The service applies a first network policy that has an associated expiration timer to the device, based on its classification as being of the first device type. The service determines whether the device was reclassified as being of a different device type than that of the first device type before expiration of the expiration timer associated with the first network policy. The service applies a second network policy to the device, when the service determines that the device has not been reclassified as being of a different device type before expiration of the expiration timer associated with the first network policy.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
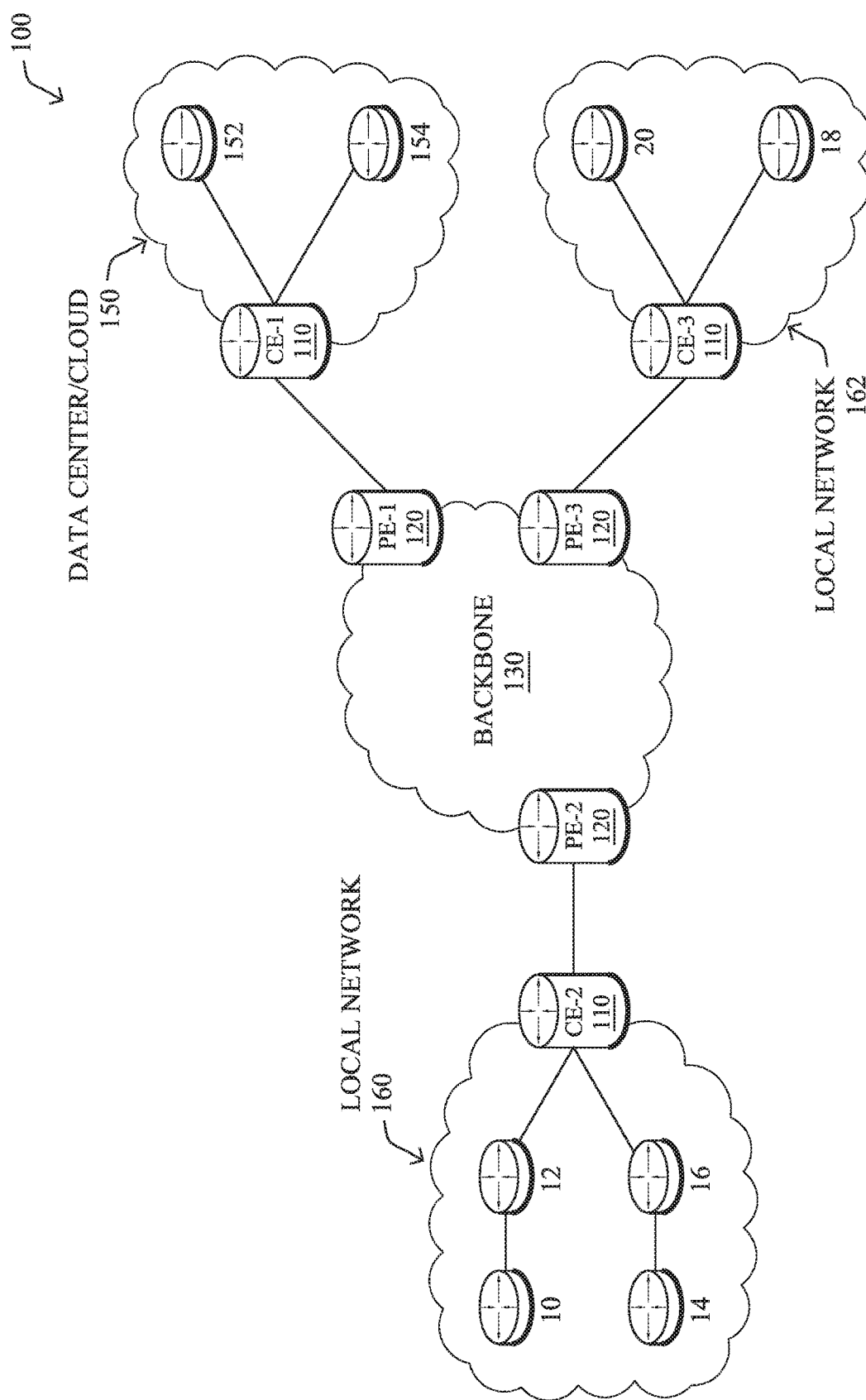

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
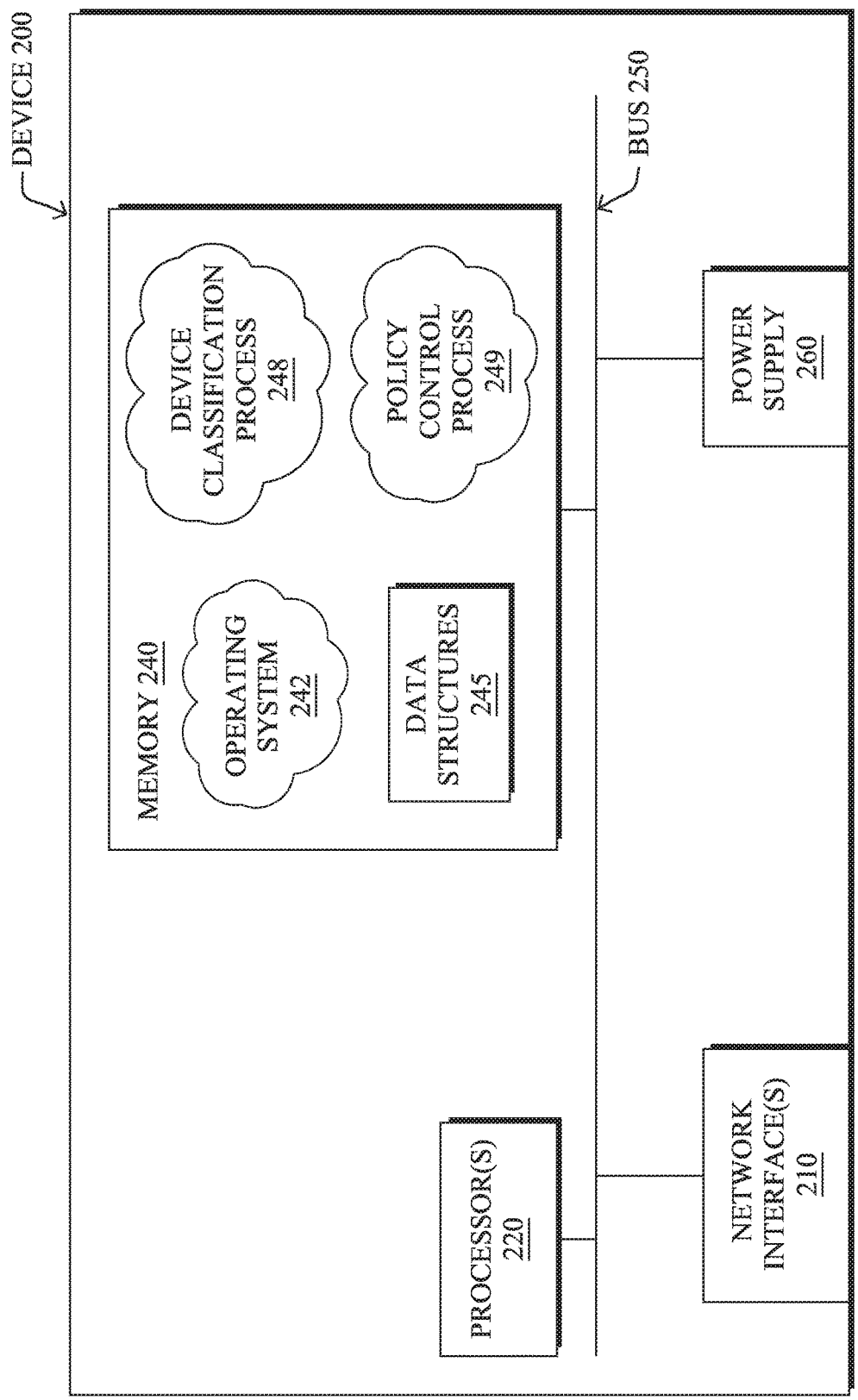
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248 and/or a policy control process 249, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model number, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
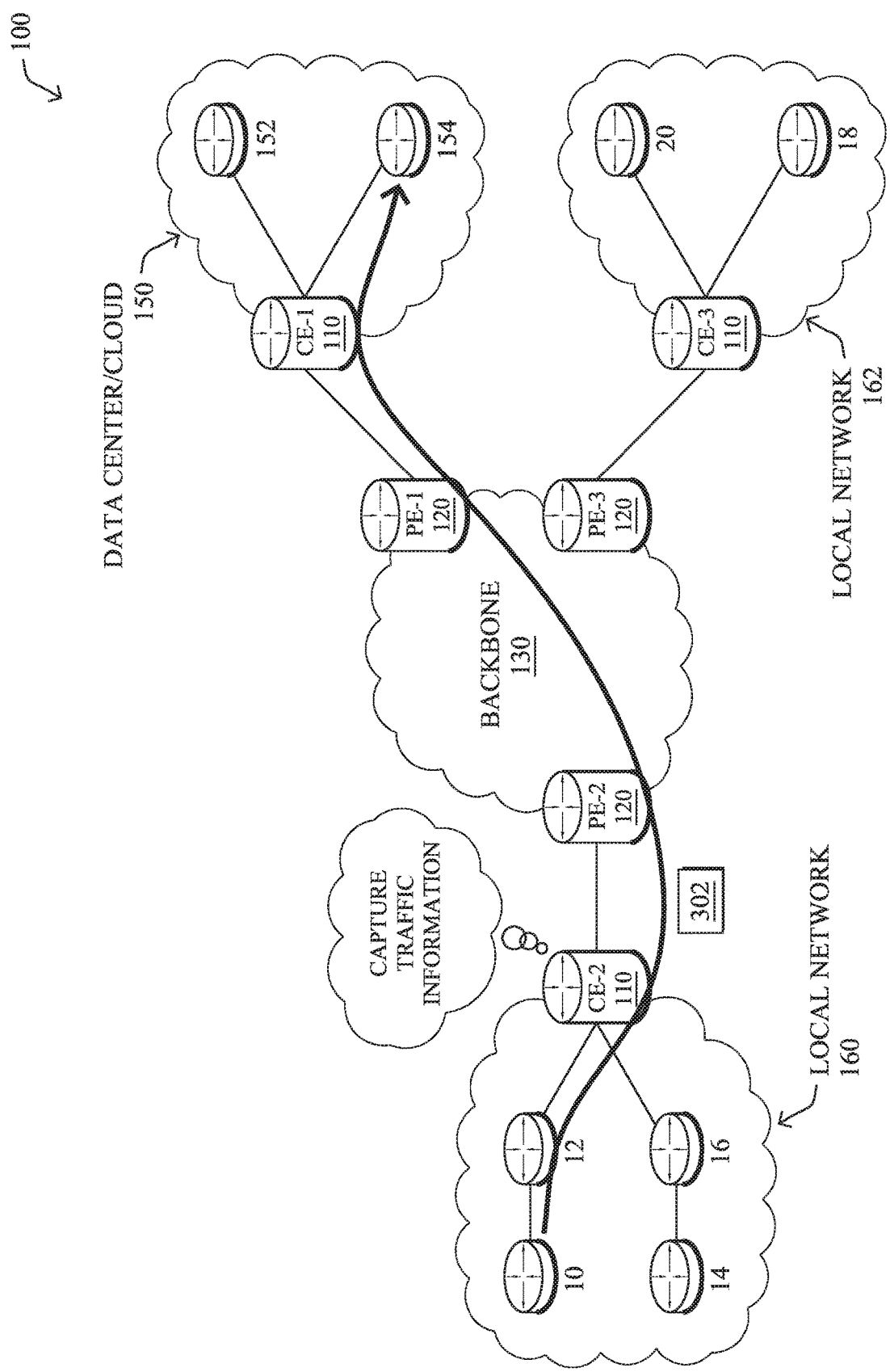
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture telemetry data about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example features in the captured telemetry data may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

As noted above, with the proliferation of IoT devices and the bring-your-own-device (BYOD) approach, it is very difficult for an administrator to provide detailed information about each device connected to the network, such as its device type (e.g., printer, iPhone, tablet, iOS 10 device, etc.). Because of the dynamic nature of modern networks, this type of information is not static and cannot be handled manually. However, such detailed information may be needed for proper assessment of security incidents involving a particular device, to apply a network access policy to the device, for purposes of traffic shaping of traffic involving the device, and other network operations.

Figure 4:
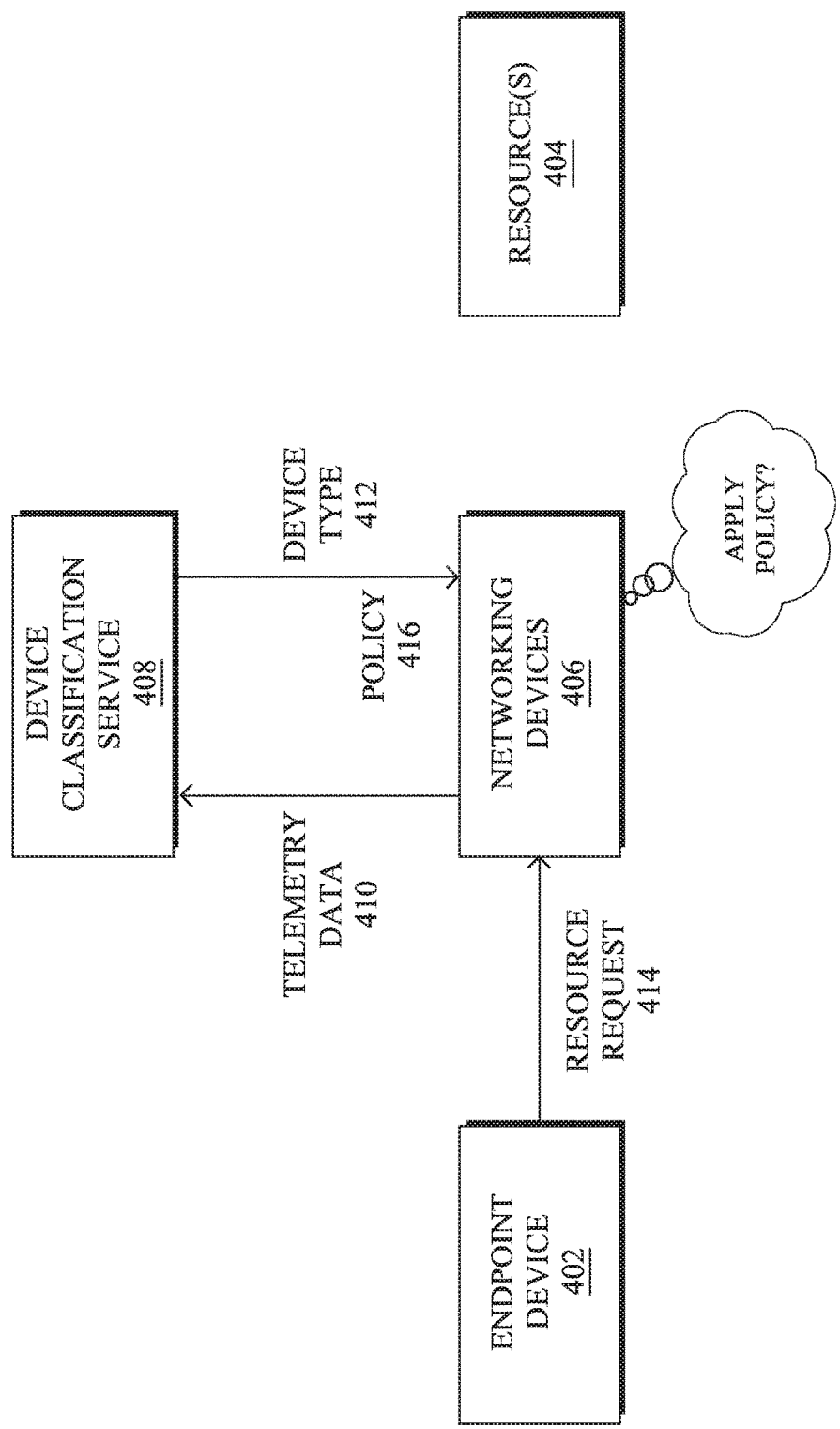
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. Service 408 may, for example, be provided through the execution of device classification process 248 and/or policy control process 249, described above. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy 416 associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses

SPAN probes, to get messages in NIT-REBOOT and SELECTING states, use of ARP cache for IP/MAC binding, etc.

Netflow probes

HTTP probes to obtain information such as the OS of the device, Web browser information, etc.

RADIUS probes

SNMP to retrieve MIB object or receives traps

DNS probes to get the Fully Qualified Domain Name (FQDN)

etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

As noted above, a typical device classification system mostly relies on a limited number of device characteristics and attributes. Most of those attributes are available within the first minutes of the device onboarding onto the network. This includes, for instance, DHCP characteristics/fingerprints and OUI information from device's MAC address. More advanced systems, such as the Identity Services Engine (ISE) by Cisco Systems, Inc. also support additional attributes such as using the result of an active port scan on the device or extracting user agent information from HTTP traffic. These additional attributes can lead to "re-classifications," if they are observed at a later point in time after the device onboarding. Unfortunately, though, this type of system is not very flexible and gives administrators very limited control over how to handle policies for "first classifications" and "re-classifications."

While deeper behavioral modeling and traffic analytics over a longer time period can help to improve the classification of a device, delaying classification until hours of traffic has been observed is impractical, as there is still an immediate need to apply policies to the device.

In both cases above, dealing with the refinement of device classifications is difficult. Sandboxing can be used, but that defeats the purpose of behavioral modeling. Indeed, in a stripped down and extremely restricted sandbox environment, the device is unlikely to be able to establish traffic patterns that would be key to recognizing its type.

Progressive Refinement of Device Classifications Using Colored Device and Policy Trees The techniques herein provide a framework to tackle device re-classifications in a principled manner without using sandboxing and enabling the use of the behavior modeling techniques without increasing the attack surface too much through overly permissive policies while the behavioral models are constructed. In some aspects, the techniques herein allow for successive levels of classification after the has onboarded onto the network, refining the device type classification as more information is gathered. In further aspects, the techniques herein afford a network administrator the ability to control how to trade off security risks during these 'data gathering' periods with higher profiling accuracy with a progressive and incremental approach, also driven by policy. Said differently, the techniques herein enable new use cases (e.g., deeper behavior modeling based on device traffic), as well as improve the handling of re-classifications in device classification and policy systems.

Specifically, according to one or more embodiments of the disclosure as described in detail below, a device classification service classifies a device in a network as being of a first device type. The service applies a first network policy that has an associated expiration timer to the device, based on its classification as being of the first device type. The service determines whether the device was reclassified as being of a different device type than that of the first device type before expiration of the expiration timer associated with the first network policy. The service applies a second network policy to the device, when the service determines that the device has not been reclassified as being of a different device type before expiration of the expiration timer associated with the first network policy.

Illustratively, the techniques described herein may be performed by hardware, software, and/or firmware, such as in accordance with the device classification process 248 and policy control process 249, which may include computer executable instructions executed by the processor 220 (or independent processor of interfaces 210) to perform functions relating to the techniques described herein.

Figure 5:
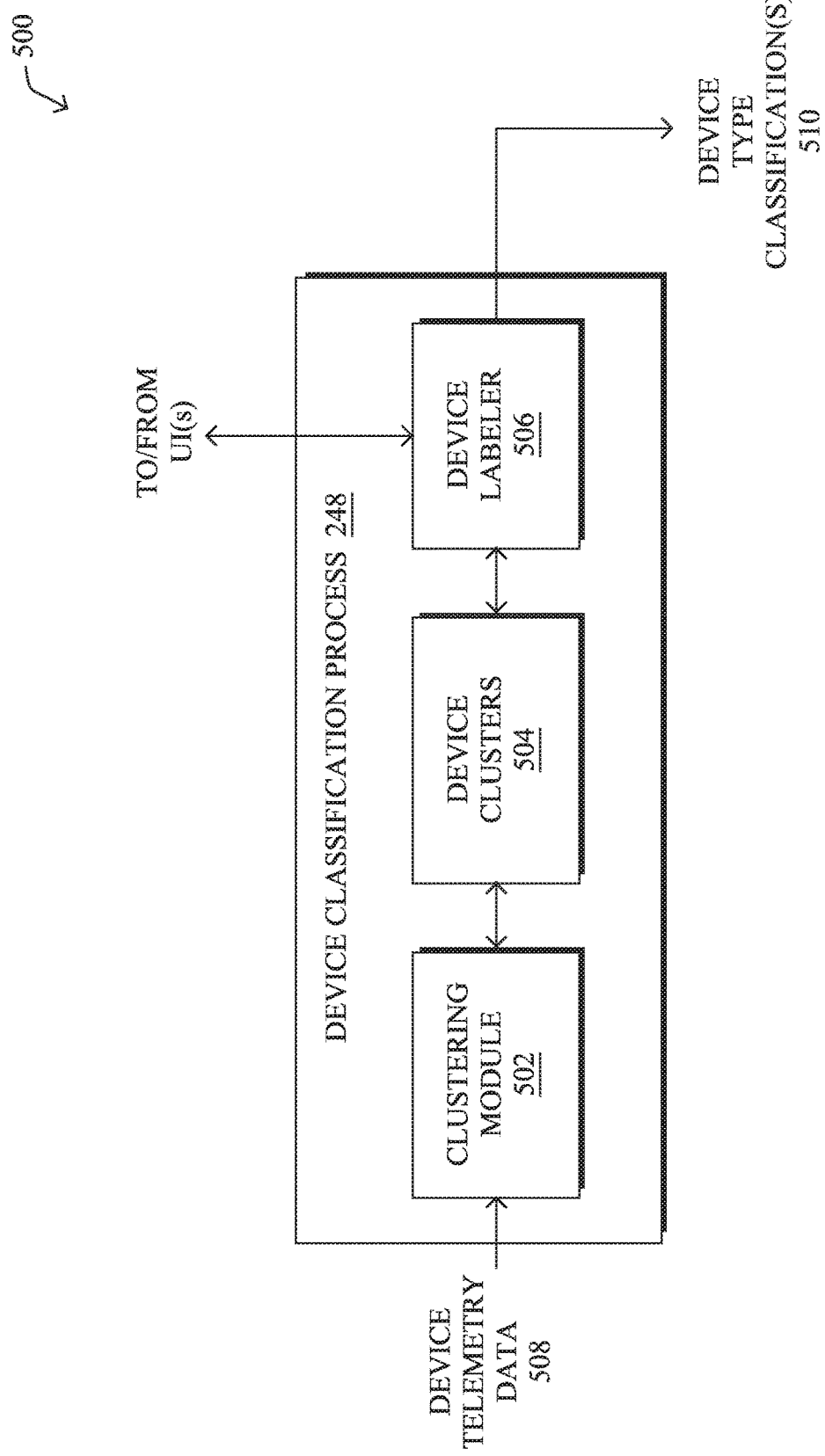
FIG. 5 illustrates an example architecture for a device classification process.

Operationally, FIG. 5 illustrates an example architecture 500 for device classification process 248, according to various embodiments. As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

As shown, device classification process 248 may receive device telemetry data 508 regarding any number of devices undergoing device type classification. Such device telemetry data 508 may include, for example, the MAC addresses of the devices, traffic features captured from the devices' traffic (e.g., which protocols were used, source or destination information, etc.), timing information (e.g., when the devices communicate, sleep, etc.), and/or any other information regarding the devices that can be used to infer their device types. For example, device telemetry data 508 may take the form of a feature vector in which each dimension represents the presence or absence of a certain protocol in the traffic of the device such as, but not limited to, IPv6, IPv4, IGMPv3, IGMPv2, ICMPv6, ICMP, HTTP/XML, HTTP, etc.

In turn, device classification process 248 may output a device type classification 510 for a device under scrutiny, thereby allowing the receiving entity to apply network policies to the device, based on its device type classification 510. For example, one such network policy may cause a networking device to prevent an MRI machine from accessing the Internet or another resource via the network.

In various embodiments, the components 502-506 of device classification process 248 may leverage active learning, to assign device type classifications 510 to the devices under scrutiny. To do so, clustering module 502 may assign the devices under scrutiny to device clusters 504, based on their telemetry data 508. For example, a device cluster 504 may include those devices that exhibit the same or similar traffic or other behavioral features. If a device type is then associated with a device cluster 504, device labeler 506 may apply that type to a device as device type classification 510. In cases in which device labeler 506 is unable to classify the cluster 504 with sufficient confidence, it may send a label request to a user interface (UI), seeking active labeling of that cluster. In other words, device classification process 248 may be configured to leverage active learning, to learn the labels of unknown devices over time. Note also that the pool of device telemetry data 508 may be from any number of networks and that device labeler 506 may seek labels for a device cluster 504 from any number of experts across any number of networks, as well. Once the cluster is labeled by an expert, device labeler 506 can then apply that label to any other devices that fall within that cluster, as well.

More formally, let $D=\{D_1, D_2, \ldots, D_N\}$ denote the set of devices seen on the one or more networks under analysis by device classification process 248, each of which is identified by its MAC address or another unique identifier. For every device $D_i$ at time t, clustering module 502 may construct a feature vector $X_{i,t}$ from the telemetry data 508 for the device. Clustering module 502 may then apply a clustering algorithm, such as DB-scan, k-means, k-medoids, etc., to create a set of device clusters 504. Let $C_t=\{C_{1,t}, \ldots, C_{K,t}\}$ denote these cluster, where $C_{j,t}$ is the $j^{th}$ set of devices clustered together at time t. As would be appreciated, the number of clusters K is typically smaller, or at most equal, to the number of points N, and the collection of clusters C defines a partition of the set of devices D. In doing so, each device represented in a device cluster 504 may exhibit similar behaviors as those of the other devices in its cluster.

Clustering module 502 may perform the device clustering periodically at a relatively high frequency (e.g., hourly) or at a lower frequency (e.g., weekly). Clustering module 502 can also produce subsequent clustering either by performing new clustering from scratch or by leveraging warm-starting techniques whereby $C_{t+1}$ is obtained by running the algorithm on data corresponding to that time point, but using an initialization based on $C_t$. Whether clustering module 502 uses warm-starting can have a large impact on the 'trajectory' of the clustering and is an important design consideration.

According to various embodiments, device labeler 506 may also be configured to generate a device classification rule for a given device cluster 504, based on its associated telemetry data 508 and the device type labels obtained from experts through active learning. For example, device labeler 506 may aggregate the labels obtained from the experts, to form a finalized device type classification label for the device cluster 504, using any number of conditions (e.g., whether a threshold number of the labels agree, the majority of labels, etc.). In turn, device labeler 506 may associate this label with the telemetry data 508 representative of the device cluster 504, such as the centroid of the cluster, etc.

By generating a device classification rule, device labeler 506 can then use this rule to quickly assess the telemetry data for new devices on the network(s). In addition, device labeler 506 can also deploy the rule to any number of Identity Service Engines and/or device classification services in the network(s), to perform the device classifications locally. At this point, every new device appearing on the network and matching the rule gets identified with the corresponding device type.

In various embodiments, device classification process 248 may reclassify a device periodically, at a predefined time, or in response to a request to do so. For example, as the device under scrutiny uses the network, additional device telemetry data 508 can be captured. Generally speaking, the more telemetry data regarding the behavior of the device, the greater the accuracy of the resulting device type classification 510. Indeed, there may be slight behavioral differences between devices of different types, leading device classification process 248 to misclassify the device, initially, but correct this misclassification later on in time, as more information about the device becomes available.

Figure 6:
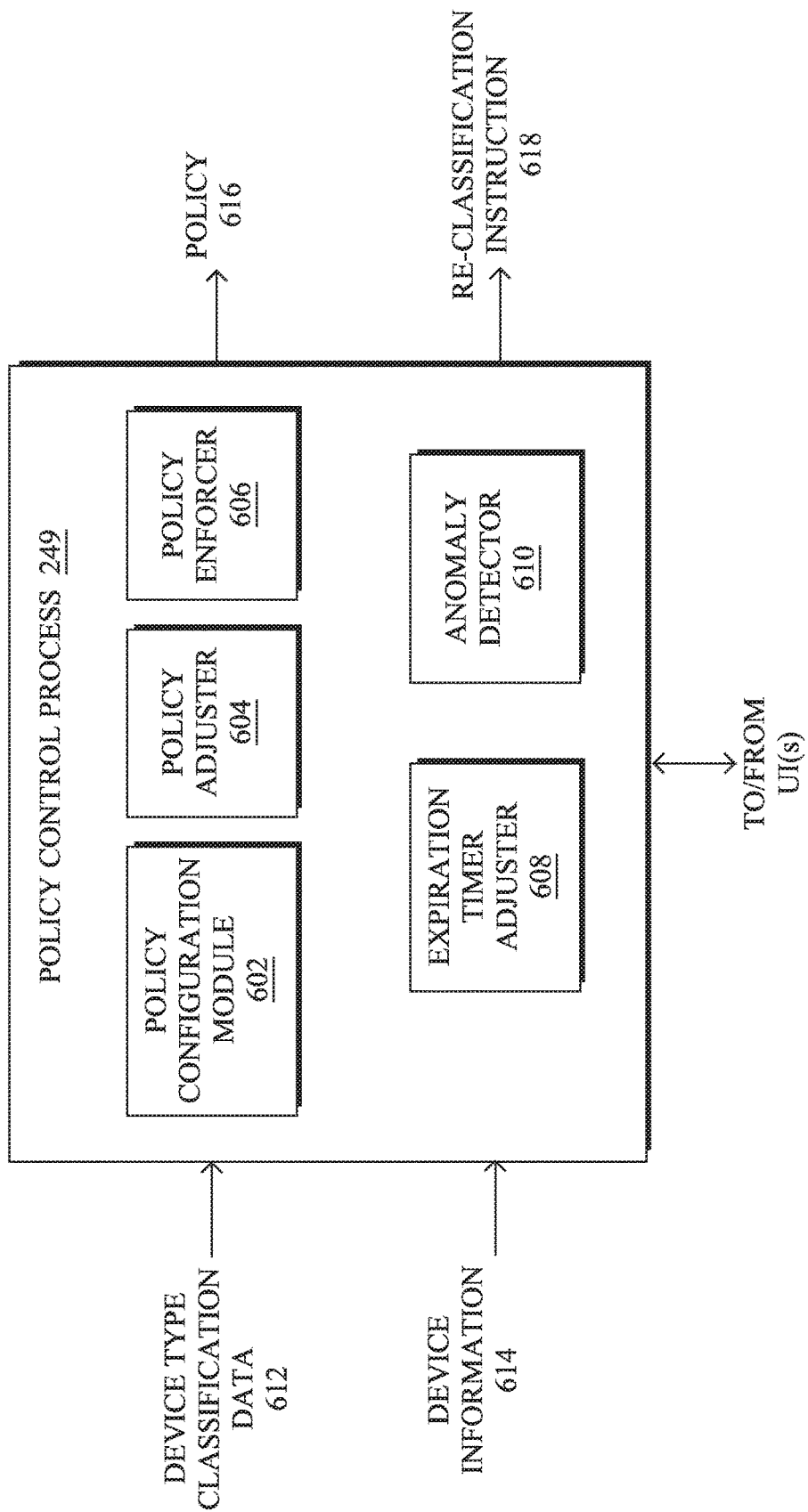
FIG. 6 illustrates an example architecture for a policy control process.

FIG. 6 illustrates an example architecture 600 for policy control process 249, according to various embodiments. In various embodiments, policy control process 249 may be configured to operate in conjunction with device classification process 248 to apply a network policy to a device in its network, based on the device classification of the device by process 248. For example, both processes 248, 249 may be implemented as part of a service for a network or distributed among the various networking devices. As shown, policy control process 249 may include any or all of the following components: a policy configuration module 602, a policy adjuster 604, a policy enforcer 606, a policy decision evaluator 608, an expiration timer adjuster 608, and/or an anomaly detector 610.

As shown, device classification process 248 may include any or all of the following components: clustering module 502, device clusters 504, and/or a device labeler 506, to provide a device classification service to one or more networks. These components 502-506 may be implemented in a distributed manner or implemented on a single device. In addition, some or all of components 502-506 may be implemented as part of a monitored network (e.g., at the network edge) or part of a cloud-based device classification service. For example, in some implementations, a cloud-based device classification service may perform centralized rule generation for any number of networks that perform the classifications locally. The functionalities of the components of architecture 500 may also be combined, omitted, or implemented as part of other processes, as desired.

In various embodiments, policy configuration module 602 may include a database of network policies and allow an administrator to define and edit these policies via a user interface (UI). Such policies can be accessed, searched, and edited in a number of different ways. In one embodiment, the device types may be grouped according to their restrictiveness. For example, the policies may be color coded, with each color reflecting the restrictiveness of the policy (e.g., red represents the most restrictive, green represents the list restrictive, etc.). This allows an administrator to more easily configure the application of network policies to devices in the network, such as by 'coloring' a set of possible device type classifications in the network.

In one embodiment, policy configuration module 602 may allow an administrator to associate network policies with device types through the use of a hierarchical representation of the device types, such as a hierarchical tree structure. Indeed, the possible device type classifications may be indicative of a manufacturer of the device, a model of the device, a version associated with the device, etc., with varying degrees of specificity. Thus, module 602 may represent the possible device type classification labels to the administrator via the UI as a tree structure, to simplify the configuration of policies to be applied to the different device types.

Figure 7:
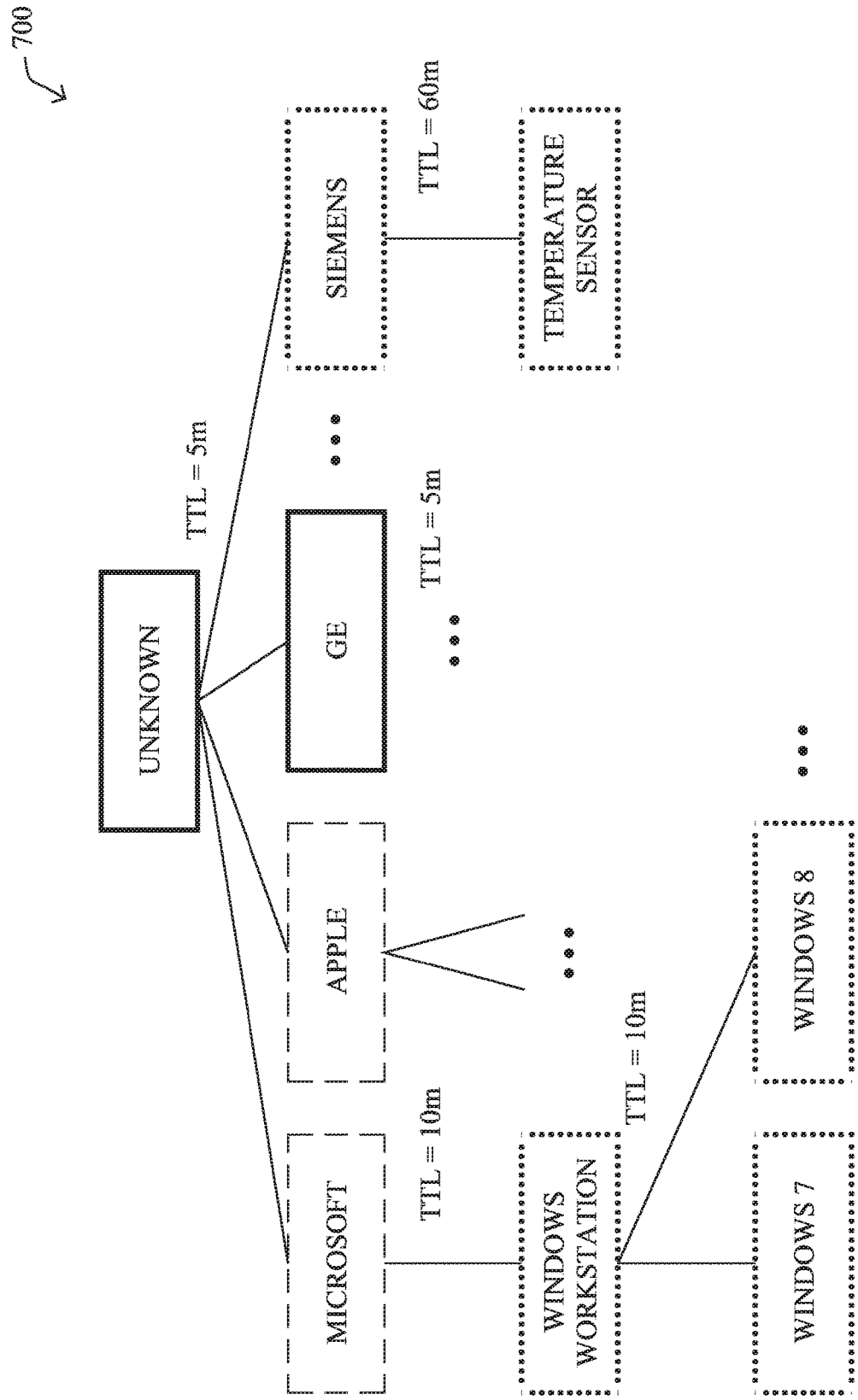
FIG. 7 illustrates an example device type hierarchy.

Referring briefly to FIG. 7, an example device type hierarchy 700 is shown, to facilitate the assignment of network policies to the different device type labels applied by the device type classifier (e.g., device classification process 248, described previously). As shown, hierarchy 700 may be of the form of a tree structure with a root node representing an 'unknown' device type, which can serve as the default classification for devices. Below this root node may be any number of children representing a first characteristic of the device type, such as the manufacturer (e.g., Microsoft, Apple, GE, Siemens, etc.). Under those nodes may be children nodes representing more specific types of the devices from that manufacturer. For example, under the 'Microsoft' node may be a node for 'Windows Workstation' and under the 'Siemens' node may be a node for 'temperature sensor.' Similarly, under the 'Windows Workstation' node may be nodes representing different versions of Windows, such as 'Windows 7,' 'Windows 8,' etc.

Associated with each node in hierarchy 700 may be a network policy, which can be represented to the user in group form via indicia such as colorations. For example, the 'Unknown' node may be colored red, to indicate that the most restrictive network policy should be applied to devices classified as being of the 'unknown' type. In doing so, an administrator can quickly and easily apply different network policies to different device types. Of course, colors/network policies can also be associated with the different device types/nodes by default, as well.

One key aspect of the techniques herein is also the ability of the administrator to assign device types to 'zones' based on the current estimated device type. For instance, a device may initially get classified at onboarding as a 'Microsoft' workstation based on its DHCP telemetry data and similar attributes. Further classification refinements may then either lead to the device being reclassified as a 'Windows'' workstation and then a 'Windows 7 workstation,' but could also go in another direction, in some cases. For example, the initial classification of the device as being a 'Microsoft' device may be a misclassification and, with reclassification using additional telemetry data for the device, the device may be reclassified as being of a different type, entirely (e.g., maybe this is a particular kind of device that only happens to be running Microsoft software). Based on a simplified tree system, such as hierarchy 700 shown, the device under scrutiny would get associated to a certain zone with corresponding policies.

In various embodiments, the network policies in a given zone may also have associated expiration timers. If the device does not get reclassified to a more specific classification before expiration of the timer, the device may be down-graded to a zone with more restrictive policies. Note that the amount of time a device can stay in a given zone with a certain level of permissions can also be controlled by policy. For example, an administrator may specify that a device classified as a 'Microsoft' device can have an intermediate level of permissions on the network for a Time to Live (TTL) period of 10 minutes. If the device is not reclassified as a more specific type of 'Microsoft' device within this time period, the system may move the device to a classification with a more restrictive network policy/coloration, such as the 'Unknown' type.

Conversely, if the additional telemetry data collected regarding the device under scrutiny causes that device to be classified as being of a more specific device type before expiration of the policy's expiration timer, the system may move the device to a new zone with potentially less restrictive policies. For example, if the classifier refines its classification of the device as being a 'Microsoft' device to being a 'Windows' device within 10 minutes, the device may transition to a less restrictive policy associated with the 'Windows' node in hierarchy 700. In some embodiments, leaf nodes in hierarchy 700 which, by definition, are the most specific device type classifications available in the system, may have associated network policies that do not have expiration timers at all. For example, if further classification of the device under scrutiny results in the device being labeled as being a 'Windows 7' device, it may receive the least restrictive network policy indefinitely.

Said differently, the policy control process may consider certain device type classifications as inaccurate and/or temporary, under the assumption that they should be refined with more telemetry data. Note that the system can also support a sandboxing mode whereby zone policies are chosen to be much less restrictive, so that the real behavior of the device can be observed, as a device in a sandboxed environment may generate no interesting traffic that would allow for a better classification.

Referring again to FIG. 6, policy configuration module 602 may present the hierarchy of all possible device type classification to the UI, allowing the administrator to edit the policy and zone configurations. This, of course, assumes that the device classification service has a notion of hierarchy of labels for the device types, which is the case for instance if the labels are structured (e.g., hardware manufacturer, device model, software). This can also be encoded manually in the profiler (e.g., as is the case for the Cisco ISE profiler, which has a notion of children/parent classifications).

Using the UI, the administrator can select parts of the hierarchy and color the nodes according the policies that he or she wants to associate to the corresponding zones. The timeouts can either be set based on the color (e.g., red zones have a time of X), manually overridden for certain parts of the tree, or left for the system to decide (e.g., some devices may require more time to get properly profiled). Note that colors are not always tied to tree depth, either. A critical device may be in the red zone, even if it has a current classification deep in the tree (i.e., quite precise), whereas a less critical device or classification that is less subject to be "sensitive" (e.g., a hardwired sensor reporting temperature) may be in the green zone farther up in the tree, even if the classification has not been refined much for this device.

In another embodiment, another way for an administrator to set policies may be through the application of colors to the hierarchy using a query mechanism. For example, the administrator may be able to set the policy color of all leaf nodes as green, all nodes at depth 1 from the root node as red, etc. Similarly, the administrator may be able to query for all the device types that match a certain keyword or attribute and assign a given policy. If "meta-classifications" are supported by the device classifier (e.g., in Cisco ISE, with logical profiles), this can also be used as a way to query and color the nodes of the hierarchy.

As shown, another component of policy control process 249 may be policy adjuster 604. In general, policy adjuster 604 is configured to regularly evaluate policy decisions based on the latest device information 614 observed for each device. For instance, policy adjuster may gather device information 614 from systems such as a device profiler (e.g., Cisco ISE, etc.), traffic records (e.g., IPFIX, Netflow, etc.), DPI, third-party systems, and the like. Either on a schedule (e.g., ever 5 minutes) or when new device information 614 becomes available, policy adjuster 604 may send a re-classification instruction 618 to device classification process 248, to attempt re-classification of the device.

In various embodiments, policy control process 249 may also include policy enforcer 606 configured to apply a policy 616 to a device, based on its device type classification data 612 (e.g., from device classification process 248). For example, policy 616 may restrict the device from accessing certain resources via the network (e.g., a certain destination, the Internet, etc.). In further embodiments, policy enforcer 606 may apply policy 616 to the device in accordance with the policy rules configured by policy configuration module 602. For example, if the current policy 616 applied to the device has an expiration timer, and the timer has expired without the device being reclassified to a more specific classification, policy enforcer 606 may move the device to a different policy according to the rules encoded to the rules encoded in the zone configuration. Conversely, if the device has been reclassified by device classification process 248, as indicated by device type classification data 612, policy enforcer 606 may apply the corresponding policy 616 to the device, based on its re-classification.

In further embodiments, policy control process 249 may include expiration timer adjuster 608 configured to collect data from policy configuration module 602, policy adjuster 604, and policy enforcer 606, to help the administrator define policies and policy expiration timers that make the most sense, without unduly tolerating high risk. In particular, expiration timer adjuster 608 may monitor, for each path in the device type hierarchy, the time spent in each color and the number of devices reclassified with respect to time. For example, if a policy color has an expiration timer of one hour most devices get reclassified to a more specific color in less than 15 minutes, expiration timer adjuster 608 may determine that the expiration timer is unnecessarily high and can be reduced without impacting too much the profiling capabilities of the network, thereby reducing any potential security risks. Similarly, if devices never get reclassified once they reach a certain non-leaf color in the hierarchy, expiration timer adjuster 608 may determine that the expiration timer is too low for behavioral traffic modeling to recognize the type of the device and that increasing the expiration timer for that color could improve the classification accuracy. In various embodiments, expiration timer adjuster 608 may make the timer adjustments automatically or do so after receiving confirmation of the adjustment from the UI (e.g., by presenting the suggested change to the administrator).

A further component of policy control process 249 may be anomaly detector 610 used to report device activity according to their applied policies/colored zones. Indeed, it may be useful for devices in the red zone of the device type hierarchy (e.g., the most restrictive policy) to be tracked more carefully with regards to their traffic activity. Any detection of suspicious activity using Index of Compromise (IOC) should be reported. Accordingly, anomaly detector 610 may assess the device information 614 of the device and apply anomaly detection to the behaviors of the device, to flag devices that are behaving abnormally. For example, anomaly detector 610 may flag a particular device in the 'red' zone as having an abnormal amount of traffic and report the detected anomaly to the UI for review. In further cases, the findings of anomaly detector 610 could also trigger even more severe actions, such as blocking all traffic of the device or the like.

Figure 8:
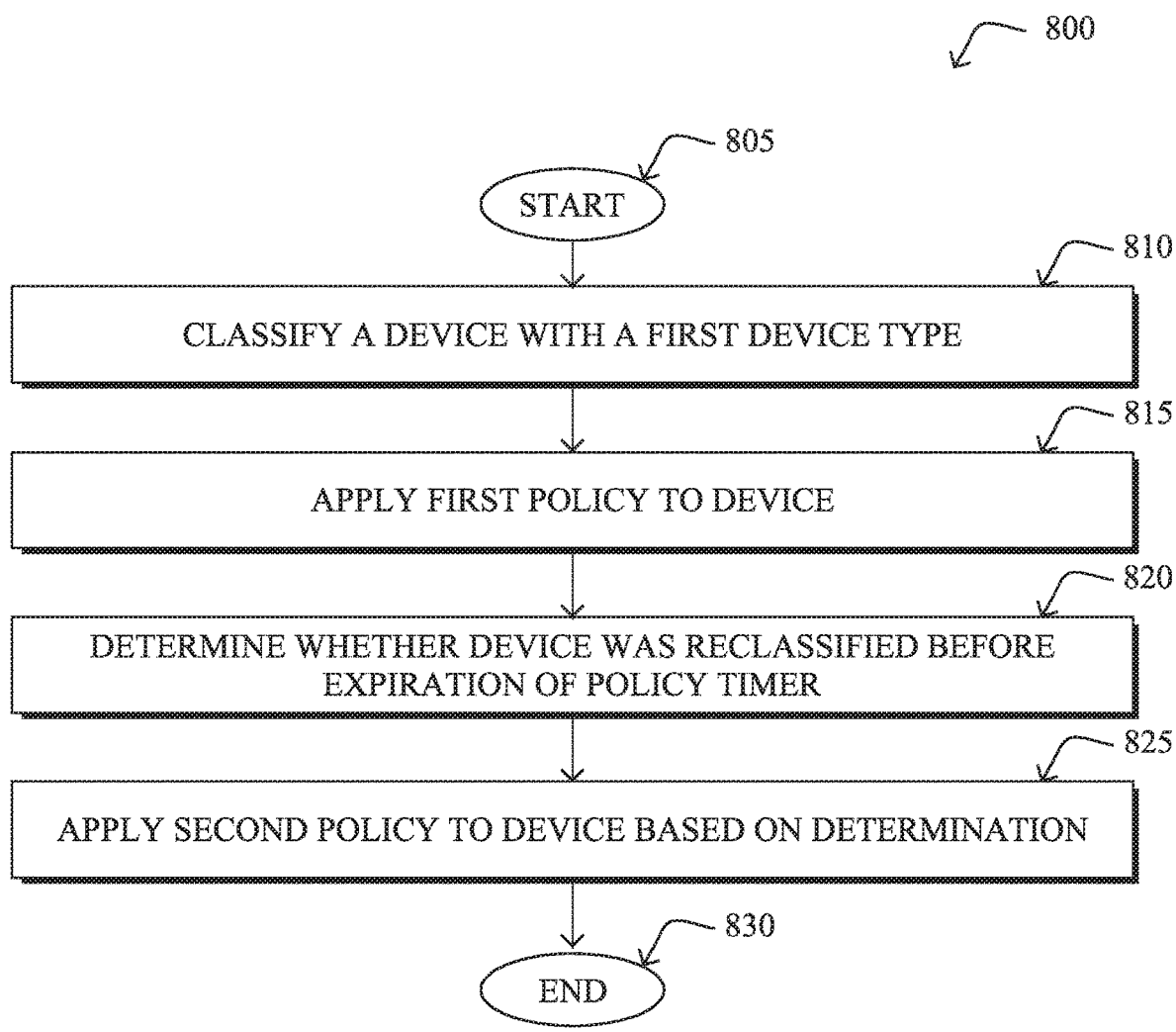
FIG. 8 illustrates an example simplified procedure for the progressive refinement of device classifications.

FIG. 8 illustrates an example simplified procedure for the progressive refinement of device classifications, in accordance with one or more embodiments described herein. For example, a non-generic, specifically configured device (e.g., device 200) may perform procedure 800 by executing stored instructions (e.g., processes 248, 249), to provide a device classification service to one or more networks. The procedure 800 may start at step 805, and continues to step 810, where, as described in greater detail above, the device classification service may classify a device in a network as being of a first device type. For example, the service may obtain telemetry data regarding traffic of the device in the network (e.g., traffic information, etc.) and use the obtained telemetry data as input to a machine learning-based device type classifier, to label the device as being of the first device type.

At step 815, as detailed above, the service may apply a first network policy to the device, based on its classification as being of the first device type. In various embodiments, the first network policy has an associated expiration timer. In general, the network policy may dictate which resources the device may access, such as particular destinations, certain networks, etc.

At step 820, the service may determine whether the device was reclassified as being of a different device type than that of the first device type before expiration of the expiration timer associated with the first network policy, as described in greater detail above. In other words, the expiration timer may afford the service additional time to collect telemetry data regarding the device and arrive at a more specific device classification than that of the first device type, while still allowing the device to be onboarded onto the network and begin using the service.

At step 825, as detailed above, the service may apply a second network policy to the device, when the service determines that the device has not been reclassified as being of a different device type before expiration of the expiration timer associated with the first network policy. In various embodiments, the second network policy may be more restrictive than the first network policy. Indeed, if the service was unable to reclassify the device to another device type before the expiration timer expires, the device may be moved to a more restrictive network policy. Conversely, if the device is reclassified before the timer expires, the service may move the device to a policy associated with the new classification. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a device classification service to apply a network policy to a device in a network based on its initial classification. In turn, the service may refine its classification, leading to a new policy being applied to the device. Doing so allows the service to leverage a more robust set of behavioral features captured regarding the device for purposes of classification, while still allowing the device to use the network. In further aspects, the techniques herein provide an administrator an easy way to configure policies through the use of a device type hierarchy and colored 'zones' within the hierarchy.

While there have been shown and described illustrative embodiments that provide for the progressive refinement of device type classifications, it is to be understood that various other adaptations and modifications may be made within the spirit and scope of the embodiments herein. For example, while certain embodiments are described herein with respect to using certain models for purposes of device type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device classification service, telemetry data regarding traffic of a device in a network;
   classifying, by the service, the device as being of a first device type using the obtained telemetry data;
   applying, by the service, a first network policy to the device, based on its classification as being of the first device type, wherein the first network policy has an associated expiration timer;
   determining, by the service, whether the device was reclassified as being of a different device type than that of the first device type, using additional telemetry data obtained after the classification of the device as being of the first device type, before expiration of the expiration timer associated with the first network policy; and
   applying, by the service, a second network policy to the device, when the service determines that the device has not been reclassified as being of a different device type before expiration of the expiration timer associated with the first network policy.

2. The method as in claim 1, wherein classifying the device as being of the first device type comprises:
   using the obtained telemetry data as input to a machine learning-based device type classifier.

3. The method as in claim 1, wherein the second network policy is more restrictive than the first network policy.

4. The method as in claim 1, further comprising:
   maintaining, by the device classification service, a hierarchy of device types as a tree structure, wherein each node of the tree structure represents a different device type and has an associated network policy.

5. The method as in claim 4, further comprising:
   reclassifying the device as being of a particular device type, before expiration of the expiration timer associated with the first network policy, wherein the particular device type is represented in the tree structure as a leaf node, and wherein the leaf node is associated with a network policy that does not have an expiration timer.

6. The method as in claim 1, wherein the first device type is indicative of one or more of: a manufacturer of the device, a model of the device, or a version associated with the device.

7. The method as in claim 1, further comprising:
   receiving the expiration timer associated with the first network policy via a user interface.

8. The method as in claim 1, further comprising:
   monitoring amounts of time the first network policy is applied to devices before they are reclassified; and
   adjusting the expiration timer associated with the first network policy, based on the monitored amounts of time.

9. An apparatus, comprising:
   one or more network interfaces to communicate with one or more networks;
   a processor coupled to the network interfaces and configured to execute one or more processes; and
   a memory configured to store a process executable by the processor, the process when executed configured to:
      obtain telemetry data regarding traffic of a device in the one or more networks;
      classify the device as being of a first device type using the obtained telemetry data;
      apply a first network policy to the device, based on its classification as being of the first device type, wherein the first network policy has an associated expiration timer;
      determine whether the device was reclassified as being of a different device type than that of the first device type, using additional telemetry data obtained after the classification of the device as being of the first device type, before expiration of the expiration timer associated with the first network policy; and
      apply a second network policy to the device, when the service determines that the device has not been reclassified as being of a different device type before expiration of the expiration timer associated with the first network policy.

10. The apparatus as in claim 9, wherein the apparatus classifies the device as being of the first device type by:
    using the obtained telemetry data as input to a machine learning-based device type classifier.

11. The apparatus as in claim 9, wherein the second network policy is more restrictive than the first network policy.

12. The apparatus as in claim 9, wherein the process when executed is further configured to:
    maintain a hierarchy of device types as a tree structure, wherein each node of the tree structure represents a different device type and has an associated network policy.

13. The apparatus as in claim 12, wherein the process when executed is further configured to:
    reclassify the device as being of a particular device type, before expiration of the expiration timer associated with the first network policy, wherein the particular device type is represented in the tree structure as a leaf node, and wherein the leaf node is associated with a network policy that does not have an expiration timer.

14. The apparatus as in claim 9, wherein the first device type is indicative of one or more of: a manufacturer of the device, a model of the device, or a version associated with the device.

15. The apparatus as in claim 9, wherein the process when executed is further configured to:

receive the expiration timer associated with the first network policy via a user interface.

16. The apparatus as in claim 9, wherein the process when executed is further configured to:
- monitor amounts of time the first network policy is applied to devices before they are reclassified; and
- adjust the expiration timer associated with the first network policy, based on the monitored amounts of time.

17. A tangible, non-transitory, computer-readable medium storing program instructions that cause a device classification service to execute a process comprising:
- obtaining, by the device classification service, telemetry data regarding traffic of a device in a network;
- classifying, by the device classification service, the device as being of a first device type using the obtained telemetry data;
- applying, by the service, a first network policy to the device, based on its classification as being of the first device type, wherein the first network policy has an associated expiration timer;
- determining, by the service, whether the device was reclassified as being of a different device type than that of the first device type, using additional telemetry data obtained after the classification of the device as being of the first device type, before expiration of the expiration timer associated with the first network policy; and
- applying, by the service, a second network policy to the device, when the service determines that the device has not been reclassified as being of a different device type before expiration of the expiration timer associated with the first network policy.

18. The computer-readable medium as in claim 17, wherein classifying the device as being of the first device type comprises:
- using the obtained telemetry data as input to a machine learning-based device type classifier.

19. The computer-readable medium as in claim 17, wherein the process further comprises:
- maintaining, by the device classification service, a hierarchy of device types as a tree structure, wherein each node of the tree structure represents a different device type and has an associated network policy.

20. The computer-readable medium as in claim 19, wherein the process further comprises:
- reclassifying the device as being of a particular device type, before expiration of the expiration timer associated with the first network policy, wherein the particular device type is represented in the tree structure as a leaf node, and wherein the leaf node is associated with a network policy that does not have an expiration timer.

* * * * *

UNITED STATES PATENT AND TRADEMARK OFFICE
CERTIFICATE OF CORRECTION

PATENT NO. : 10,924,353 B2  
APPLICATION NO. : 16/424574  
DATED : February 16, 2021  
INVENTOR(S) : Pierre-André Savalle et al.

Page 1 of 1

It is certified that error appears in the above-identified patent and that said Letters Patent is hereby corrected as shown below:

In the Specification

Column 9, Line 7, should read:  
SPAN probes, to get messages in INIT-REBOOT and Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*